April 21, 1970     P. W. McCONNAUGHEY     3,507,623

ARTICLE FOR THE DETERMINATION OF CARBON MONOXIDE

Filed April 2, 1968

INVENTOR.
PAUL W. McCONNAUGHEY.
BY
Ronald H. Shakely
his ATTORNEY.

United States Patent Office 3,507,623
Patented Apr. 21, 1970

3,507,623
ARTICLE FOR THE DETERMINATION OF CARBON MONOXIDE
Paul Willis McConnaughey, Pittsburgh, Pa., assignor to Mine Safety Appliances Company, Pittsburgh, Pa., a corporation of Pennsylvania
Continuation-in-part of application Ser. No. 487,420, Sept. 15, 1965. This application Apr. 2, 1968, Ser. No. 718,050
Int. Cl. G01n 31/22
U.S. Cl. 23—254      4 Claims

ABSTRACT OF THE DISCLOSURE

An article for determining carbon monoxide has a transparent tube that is openable to the atmosphere containing a bed of indicator that changes color in response to carbon monoxide and a gas permeable plug between the bed of indicator and the openable end of the tube. A second bed of indicator disposed between the gas permeable plug and the openable tube end protects the first bed from deterioration.

---

Figure 1:
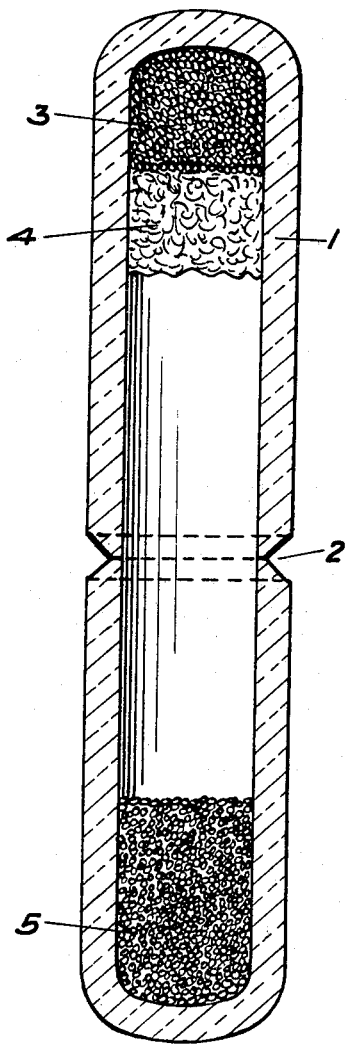

This application is a continuation-in-part of my application Ser. No. 487,420, filed Sep. 15, 1965, now abandoned.

This invention relates to the colormetric determination of carbon monoxide.

In well-known apparatus and methods for quantitatively determining carbon monoxide, an air sample of known volume is drawn through a transparent tube containing a bed of granular chemical indicator that goes through several color changes in response to reaction with carbon monoxide. The concentration of carbon monoxide in the air sample is determined by comparison of the color of the indicator with a calibrated color chart. Suitable indicators for such methods are palladium sulfate-ammonium molybdate indicator disclosed in United States Patent 2,487,077 and alkali metal palladosulfites disclosed in United States Patent 2,569,895. Although such apparatus have been widely accepted by industry, something even more simple and less expensive but equally reliable is desirable for use in the home and small business, for example, for checking for dangerous carbon monoxide concentration in automobile repair shops and the like.

In accordance with this invention, a thin bed of colorimetric indicator responsive to carbon monoxide to form a series of color changes is contained adjacent the closed end of a transparent tube that has an opposite end closed from the atmosphere by openable means. A plug of gas permeable material is disposed adjacent the indicator remote from the closed end of the tube, and a second bed of the same indicator is disposed between the gas permeable plug and the openable end. The second bed of indicator is a protective bed that inhibits deterioration of the thin bed of colorimetric indicator used for determination of carbon monoxide. In use the tube is opened to the atmosphere and the second bed of indicator is discarded; carbon monoxide will diffuse through the plug at a rate dependent on its concentration in the air and react with the thin bed of indicator to produce a color change, the developed color depending on the amount of carbon monoxide that reacts with the indicator.

Figure 3:
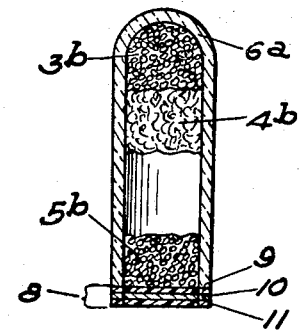
Figure 2:
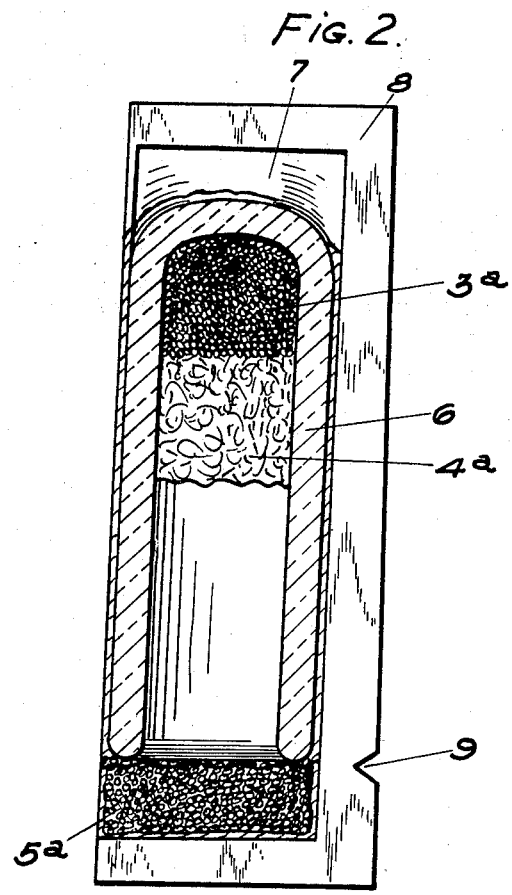

In the drawings:

FIG. 1 is a sectional view of an embodiment of this invention;

FIG. 2 showing another embodiment, is a sectional view of a tube in an envelope shown partly cut away;

FIG. 3 is a sectional view of another embodiment of this invention.

Referring to FIG. 1 a glass ampoule 1 sealed at both ends has a score line 2. A bed of granular colorimetric indicator 3 and a glass wool plug 4 are disposed in the upper end of the tube above the score line. When the tube is broken on the score line, the indicator bed 3 is exposed to the atmosphere of the environment through glass wool plug 4 which holds the indicator 3 in place and place and acts as a diffusion path. Carbon monoxide diffuses through it at a rate dependent on its concentration and reacts with the indicator. In order to obtain a uniform indicator color, suitable for color comparison, it is necesary that the length or thickness of indicator bed 3 does not exceed about 3 mm., preferably having a length between about 1–3 mm. For other than round tubes, the diameter may be considered the diameter of a circle having the same area as the tube opening. The average concentration of carbon monoxide over a given period of time is determined by comparing the color of the indicator with a precalibrated color chart. For example, the indicator of Patent 2,487,077 changes on reaction with carbon monoxide from yellow to green to blue. The following calibration chart represents the response of this indicator in a 3 mm. I.D. glass tube, a length of ¾ inch from its end to the score line, an indicator bed length of from 1–3 mm. and a 1–3 mm. long glass wool plug.

| Carbon Monoxide + Concentration (p.p.m.) | Minutes exposure to obtain Munsell color #7.5GY7/5 | Minutes exposure to obtain Munsell Color #5G5/4 | Minutes exposure to obtain color #10BG4/3 |
|---|---|---|---|
| 0 | | | |
| 20 | 13 | 60 | |
| 50 | 4 | 18 | 35 |
| 100 | 3 | 10 | 18 |
| 200 | 2 | 6.5 | 11 |
| 300 | 1.5 | 5 | 8 |
| 400 | 1 | 3.5 | 6 |
| 500 | .75 | 2.5 | 4.75 |
| 700 | .50 | 1.25 | 3 |
| 1,000 | .33 | .83 | 1.75 |

A second bed of colorimetric indicator 5 is included in the tube below the glass wool plug to protect the indicator bed 3 from contamination during sealing of the tube. In filling, one end of the tube is sealed and turned downward; indicator 3, glass wool plug 4 and indicator 5 are inserted in the tube in order and the other end of the tube is sealed. Thus, if carbon monoxide from flame sealing of the tube is trapped in the tube, it will react with the indicator 5 and not affect the indicator bed 3. This second bed of indicator is not involved at all in the determination of carbon monoxide, and is discarded when the tube is broken.

A preferred embodiment of my invention is shown in FIG. 2. A glass tube 6, closed at one end, contains a bed of colorimetric granular indicator 3a, as in FIG. 1, and a glass wool plug 4a. The tube is contained in a hermetically sealed plastic envelope 7, suitably a sheet of plastic folded around the tube and heat sealed or adhesively bonded at the edges 8. Inside the plastic envelope and outside the glass wool plug is a second bed of indicator, 5a. This second bed of indicator serves, in addition to protecting from CO entrapped during sealing of the envelope, to absorb gases that diffuse through the plastic envelope during storage and would otherwise adversely affect the indicator bed 3a. This provides a long storage life for the dosimeter, even though the plastic envelope is somewhat gas permeable. When it ise desired to use the dosimeter the plastic envelope is opened by tearing at notch 9, exposing the open dosimeter tube to the atmosphere. Indicator 5a is discarded. The dosimeter is conveniently attached to an instruction card or the like by stapling through the sealing edge 8.

The envelope may be of any plastic film material, preferably having a low permeability for gases, including moisture, most suitably polyesters, e.g., Mylar, or polyvinyliden chloride, e.g., Saran, or laminated films of aluminum and plastic.

In another embodiment illustrated in FIG. 3, a glass tube 6a closed at one end contains a bed of colorimetric granular indicator 3b and a glass wool plug 4b and a discardable bed 5b. The open end of the tube is closed by heat sealing a laminated aluminum-plastic disc 8 to the tube, suitably having a laminate of polyethylene 9, aluminum 10, and Mylar 11. The laminated disc can be punctured or pulled off the tube when it is desired to make an analysis.

The indicator of Patent 2,569,895 is used in the same manner, the color development progressing from yellow through various shades of brown.

According to the provisions of the patent statutes, I have explained the principle and mode of practice of my invention and have described what I now consider to represent its best embodiment. However, I desire to have it understood that, within the scope of the appended claims, the invention may be practiced otherwise than as specifically described.

I claim:

1. An article for determining carbon monoxide in the atmosphere consisting essentially of a transparent tube closed at one end and having an opposite end, a bed of indicator that undergoes a series of color changes in response to reaction with carbon monoxide disposed in said tube adjacent said closed end, the thickness of said bed not exceeding about 3 mm., a gas permeable plug disposed adjacent said bed and remote from said closed end, openable means closing said opposite end from the atmosphere, a second discardable bed of said indicator disposed between said plug and said openable means.

2. An article according to claim 1 in which said openable means comprises a sealed plastic envelope enclosing said tube.

3. An article according to claim 2 in which the envelope is formed from polyester film, polyvinylidene chloride film or laminated aluminum-plastic.

4. An article for determining carbon monoxide in the atmosphere consisting essentially of a sealed glass tube having closed ends and stored in its central portion, a bed of indicator that undergoes a series of color changes in response to reaction with carbon monoxide disposed adjacent one end of said tube, the thickness of said bed not exceeding about 3 mm., a gas permeable plug disposed in said tube between said bed and said score line, and a second discardable bed of said indicator disposed between said plug and the other end of said tube.

References Cited

UNITED STATES PATENTS

| | | | |
|---|---|---|---|
| 2,487,077 | 11/1949 | Shepherd | 23—232 |
| 3,025,142 | 3/1962 | Williams | 23—232 |
| 3,112,999 | 12/1963 | Grosskopf | 23—254 |
| 3,312,527 | 4/1967 | McConnaughey | 23—254 |

MORRIS O. WOLK, Primary Examiner

S. MARANTZ, Assistant Examiner

UNITED STATES PATENT OFFICE
CERTIFICATE OF CORRECTION

Patent No. 3,507,623          Dated April 21, 1970

Inventor(s)  McConnaughey, Paul Willis

It is certified that error appears in the above-identified patent and that said Letters Patent are hereby corrected as shown below:

Column 2, line 30, delete "+".

Column 4, line 14, "stored" should read -- scored --.

SIGNED AND
SEALED
SEP 15 1970

(SEAL)
Attest:

Edward M. Fletcher, Jr.
Attesting Officer

WILLIAM E. SCHUYLER, JR.
Commissioner of Patents